United States Patent
McKenney

(10) Patent No.: US 7,584,983 B2
(45) Date of Patent: Sep. 8, 2009

(54) PROBE-OPERATED TRAILER GUIDE WITH LIGHTS

(76) Inventor: Rex L. McKenney, 13914 301st Ave., Princeton, MN (US) 55371

( * ) Notice: Subject to any disclaimer, the term of this patent is extended or adjusted under 35 U.S.C. 154(b) by 435 days.

(21) Appl. No.: 11/211,282

(22) Filed: Aug. 25, 2005

(65) Prior Publication Data

US 2008/0036177 A1    Feb. 14, 2008

(51) Int. Cl.
B60D 1/36    (2006.01)
(52) U.S. Cl. ..................... 280/477
(58) Field of Classification Search ............ 280/477, 280/511; 116/28 R; 33/264
See application file for complete search history.

(56) References Cited

U.S. PATENT DOCUMENTS

| | | | | |
|---|---|---|---|---|
| 4,552,376 A | * | 11/1985 | Cofer | 280/477 |
| 5,755,453 A | | 5/1998 | Bell | |
| 5,821,852 A | * | 10/1998 | Fairchild | 340/431 |
| 6,062,160 A | | 5/2000 | Delcambre | |
| 6,139,041 A | * | 10/2000 | Murphy | 280/477 |
| 6,209,902 B1 | * | 4/2001 | Potts | 280/477 |
| 6,222,457 B1 | * | 4/2001 | Mills et al. | 340/686.1 |
| 6,273,448 B1 | * | 8/2001 | Cross | 280/477 |
| 6,279,940 B1 | | 8/2001 | Beavington | |
| 6,386,572 B1 | * | 5/2002 | Cofer | 280/477 |
| 6,499,851 B1 | * | 12/2002 | Kelly et al. | 359/850 |
| 6,827,363 B1 | * | 12/2004 | Amerson | 280/477 |
| 6,916,109 B2 | * | 7/2005 | Julicher | 280/477 |
| 7,036,840 B2 | * | 5/2006 | Kwilinski | 280/477 |
| 7,207,589 B2 | * | 4/2007 | Givens | 280/477 |
| 2006/0097481 A1 | * | 5/2006 | Nicholas | 280/477 |

* cited by examiner

*Primary Examiner*—Lesley D. Morris
*Assistant Examiner*—Marc A Scharich
(74) *Attorney, Agent, or Firm*—Raymond M. Galasso; Galasso & Associates LP

(57) ABSTRACT

A probe-operated guide is provided with battery-powered lights on a pole, such that a driver can attach a trailer to a vehicle without help from another person. The guide is mounted directly above the trailer cup on a trailer, and the lights on the guide can be adjusted in height and orientation to achieve the optimum visibility for the driver from most viewing angles. A direction light on the guide can be switched on, so that when backing up the driver can align it with a small light placed in the center-back of the vehicle. A directional probe on the guide can also be adjusted to turn on a second light on the guide when the vehicle is in position for attaching the trailer cup to a trailer hitch on the vehicle. After stopping the vehicle, the driver switches off, removes, and stores the guide and attaches the trailer to the vehicle.

5 Claims, 2 Drawing Sheets

PROBE-OPERATED TRAILER GUIDE WITH LIGHTS

FIELD OF THE DISCLOSURE

The present invention relates to guides for attaching trailers to vehicles and more particularly to a probe-operated guide with lights for attaching trailers to vehicles.

BACKGROUND

Many users of cars, trucks, and other vehicles employ trailers to haul items that are too large to fit into the vehicles. For example, owners of small boats typically haul them on trailers to water and unload the boats for use there. To attach a trailer to a vehicle, a user typically places a trailer cup attached to the front end of the trailer over a trailer hitch attached to the rear bumper of the vehicle and locks and chains the trailer cup in place. The trailer cup must be directly over the trailer hitch for the user to be able fasten it in place easily. Otherwise, the user has to move the trailer into the correct position, which can be difficult since trailers are usually manufactured at least partly of metal and can be heavy. Or the user has to reposition the vehicle, which can also be awkward and time consuming. It can also be difficult to judge the position of a trailer when a driver is backing a vehicle toward it, especially at night or when visibility is otherwise difficult. Because of these difficulties, more than one person may be needed to maneuver a vehicle and a trailer into proper position for attachment.

Therefore, mechanical guides for attaching trailers to vehicles are known in the art. For example, U.S. Pat. No. 6,062,160 for Delcambre and U.S. Pat. No. 5,755,453 for Bell both provide folding vertical guide members, in different designs, for the rear of a carrier or boat trailer. Although these guides provide general orientation that may be useful in many circumstances, they are not precise guides and may still require the assistance of a second person to attach the vehicle and trailer. For example, they do not provide lights that would make the guides highly visible at night or when visibility is otherwise difficult. Nor do they have a probe-operated light to show precisely when a vehicle is in the right position for attaching a trailer cup to the Vehicle's trailer hitch. Moreover, they are not clearly designed for general use with any vehicle and any trailer.

Therefore, there is a need for a guide for attaching trailers to vehicles that provides a highly visible direction light and a probe-operated light to show precisely when a vehicle is in the right position for attaching a trailer cup to the vehicle's trailer hitch, so that the driver of any vehicle can attach it from most directions to any trailer without aid from another person.

SUMMARY OF THE DISCLOSURE

The following explanation describes the present invention by way of example and not by way of limitation.

It is an aspect of the present invention to provide a guide for attaching trailers to vehicles comprising highly visible lights that are adjustable in height and direction of orientation.

It is another aspect of the present invention to provide a guide for attaching trailers to vehicles comprising a highly visible lights that are adjustable in height and direction of orientation.

It is another aspect of the present invention to provide a guide for attaching trailers to vehicles comprising a probe-operated light that shows precisely when a vehicle is in the right position for attaching a trailer cup to the vehicle's trailer hitch.

It is still another aspect of the present invention to provide a battery-operated power source for lights for attaching trailers to vehicles.

It is another aspect of the present invention to provide a guide for attaching trailers to vehicles such that a driver can accomplish the alignment for attachment without the aid of another person.

These and other aspects of the present invention will become readily apparent upon further review of the following specification and associated drawings. In accordance with the present invention, a probe-operated guide is provided with battery-powered lights on a pole, such that a driver can attach a trailer to a vehicle without help from another person. The guide is mounted directly above the trailer cup on a trailer, and the lights on the guide can be adjusted in height and orientation to achieve the optimum visibility for the driver from most viewing angles. A direction light on the guide can be switched on, so that when backing up the driver can align it with a small light placed in the center-back of the vehicle. A directional probe on the guide can also be adjusted to turn on a second light on the guide when the vehicle is in position for attaching the trailer cup to a trailer hitch on the vehicle. After stopping the vehicle, the driver switches off, removes, and stores the guide and attaches the trailer to the vehicle.

BRIEF DESCRIPTION OF THE DRAWINGS

The following embodiments of the present invention are described by way of example only, with reference to the accompanying drawings, in which.

DETAILED DESCRIPTION OF THE DRAWING FIGURES

The following description of drawings is offered to illustrate the present invention clearly. However, it will be apparent to those skilled in the art that the concepts of the present invention are not limited to these specific details. Also, commonly known elements are shown in diagrams for clarity, as examples only and not as limitations of the present invention.

Figure 1:
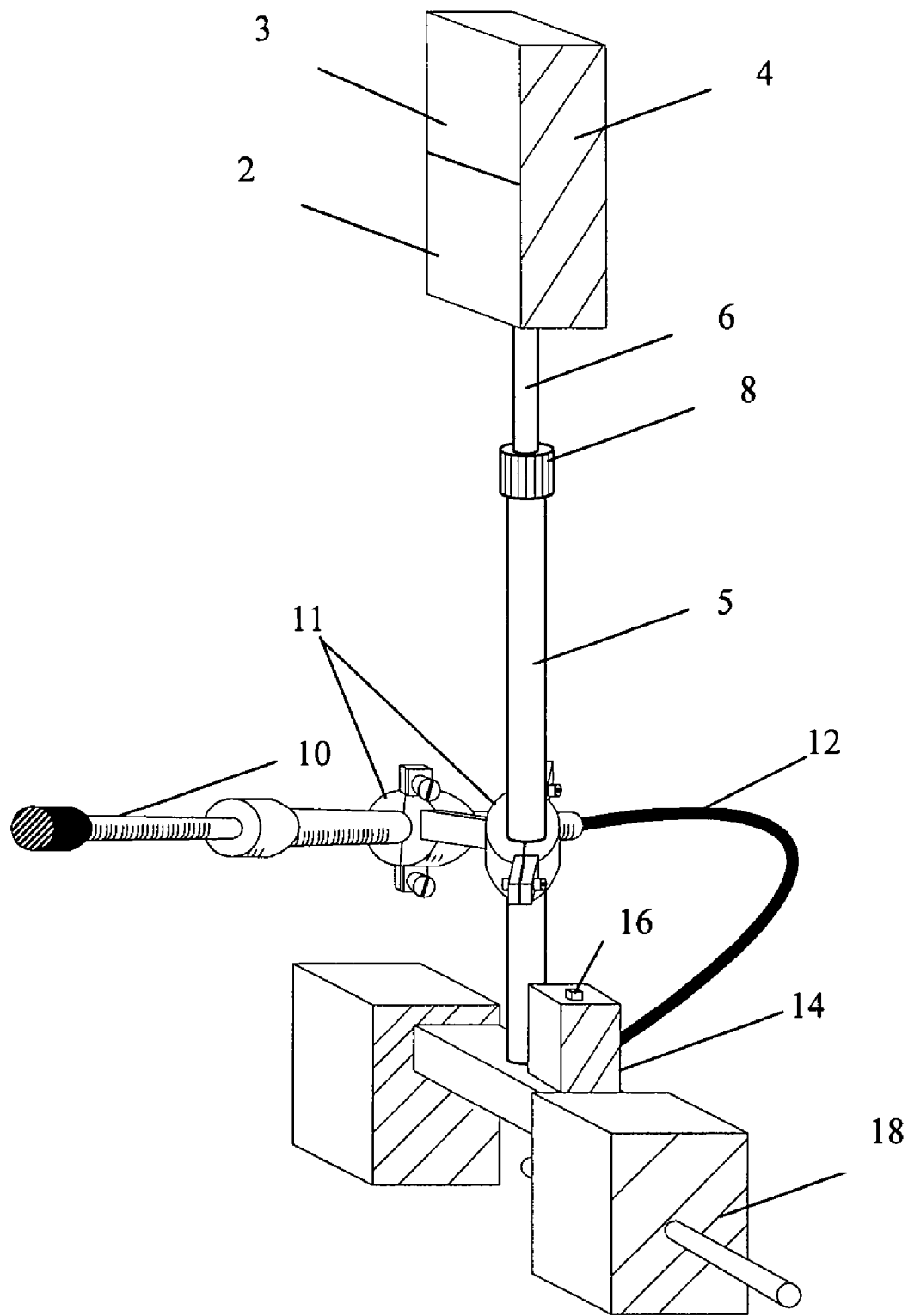
FIG. 1 is a perspective view that illustrates a probe-operated guide with lights for attaching trailers to vehicles.

The present invention comprises a probe-operated guide with lights for attaching trailers to vehicles. In an embodiment, the guide measures approximately four feet in height, sixteen inches in length, and two inches in width, with a supporting pole approximately one and three quarters of an inch in diameter. It may be manufactured of lightweight, durable materials, such as plastic or metal As shown in FIG. 1, the guide comprises the following elements:

A direction light 2,
A probe-activated light 3,
A housing 4 for the lights,
A supporting pole 5,
Means of adjusting the height of the direction light 2 and probe-activated light 3,
Means of adjusting the directional orientation of the direction light 2 and probe-activated light 3,
A directional probe 10.
Clamps 11 for attaching the directional probe,
Wires 12,
A battery 14,
An on-off switch 16 on the battery 14, and
A clamp 18 for attaching the guide to a trailer.

A small alignment light is also used for the back of the vehicle.

The direction light 2 serves to orient the user to the location of the trailer on which the guide is mounted. In an embodiment, the direction light 2 is powered by an electrical battery 14 mounted on the guide. The direction light 2 is connected to the battery 14 by wires passing through a supporting pole 5 and comes on when a user turns an on-off switch 16 on the battery 14 to the on position. Although the direction light 2 may be any color, in a useful embodiment it is red. In an embodiment the direction light 2 is contained within a housing 4.

The probe-activated light 3 comes on when a vehicle is in the right position for attaching a trailer cup to the vehicle's trailer hitch. The probe-activated light 3 is also powered by the battery 14 and is connected to it by wires 12. But the probe-activated light 3 only comes on when the telescoping directional probe 10 is compressed by contact with a vehicle to a position that completes an electrical circuit connecting the directional probe 10, the battery 14, and the probe-activated light 3. This position for the directional probe 10 can be determined by estimation and experimentation. Although the probe-activated light 3 may also be any color, in a useful embodiment it is red. The probe-activated light 3 is also contained within the housing 4. In different embodiments, the probe-activated light 3 may be located above or below the direction light 3 or in other orientations to it.

The housing 4 is mounted on a durable supporting pole 5. In an embodiment, one or more durable plastic plates cover the lights 2 and 3 within the housing 4.

Means of adjusting the height and orientation of the direction light 2 and probe-activated light 3 may also be provided. For example, in an embodiment the housing 4 may be attached to the supporting pole 5 by means of a ball and socket joint, allowing the housing 4 to be turned at many different angles, as is known in the art.

In still another embodiment, the housing 4 may be attached to a telescoping shaft 6 that slides within and can be rotated within the supporting pole 5 and can be held in position by tightening a tension collar 8. This allows the housing 4 to be raised and lowered to different positions and to be turned at different angles. This embodiment can be combined with attachment of the housing 4 to its support by means of a ball and socket joint, allowing adjustment in a very wide range of positions. For example, placing the housing 4 at a 30° angle from the vehicle may provide a particularly effective viewing angle.

The directional probe 10 is attached to the supporting pole 5, by means of swiveling clamps 11 that allow it to be placed at different heights and angles, for use with different vehicles and trailers. The directional probe 10 is spring loaded, so that upon its release from being compressed it extends outward to its full length again.

The battery 14 may comprise one or more commonly available batteries, for example two AA batteries in a waterproof box. As mentioned above, the battery is equipped with an on-off switch 16.

Figure 2:
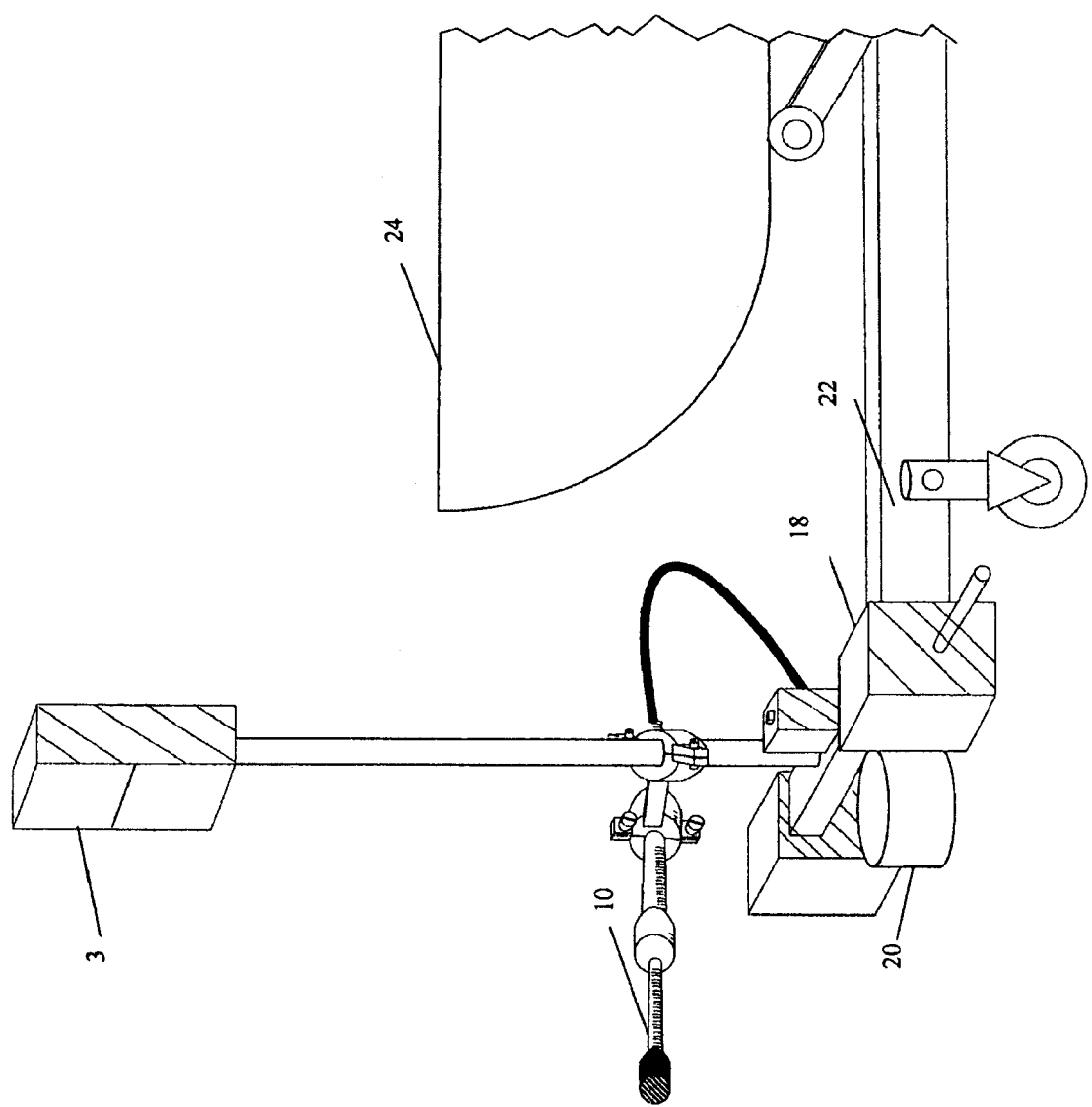
FIG. 2 is a perspective view that illustrates a probe-operated guide mounted on a trailer.

A clamp 18 or mounting plate is used to attach the guide. FIG. 2 shows how the clamp 18 is placed directly above a trailer cup 20 on a trailer 22 used for hauling a boat 24. The guide can thus be attached by means of the clamp 18 at the correct position on the trailer 22 for placing the trailer cup 20 over the trailer hitch on the rear bumper of the vehicle. In this position, the vehicle will press the directional probe 10 to the pointthat turns on the probe-activated light 3.

In another embodiment, the guide also comprises an alerting sound, for example a safety beeper, which is activated when the battery switch is switched on and alerts others that the driver will be backing up.

The alignment light may comprise a small, portable light that may be switched on and off, for example a pen light. The driver attaches it, for example with adhesive, in plain view in the center-rear of the vehicle, for example on the tailgate or in the back window, and turns it on. This allows the driver to line up the alignment light with the direction light 2, shown in FIG. 1, on the guide, when the driver is backing up the vehicle toward the trailer.

Use

Typically, the driver of a vehicle mounts the guide directly above of the trailer cup 20, shown in FIG. 2, on a trailer 22 with the clamp 18. The driver then adjusts the directional probe 10 so that it points toward the rear of the vehicle and is at the correct height and angle to touch a surface on the rear of the vehicle. The driver estimates and experiments with positioning the directional probe with the swiveling clamps 11, shown in FIG. 1, to preconfigure its position for precisely attaching the vehicle to the trailer before actual use.

The driver further turns on the switch 16 to the battery 14, which turns on the direction light 2. The driver also attaches a small light on the tailgate or in the back window of the vehicle, for example with adhesive, and turns on the small light.

During actual use, the driver backs the vehicle toward the trailer, lining up the alignment light with the direction light 2, which is especially effective when visibility is difficult, for example at night. When a surface on the rear of the vehicle presses the directional probe to the correct position for attaching the vehicle and the trailer, the probe-operated light 3 comes on. The driver then stops the vehicle, typically puts on the emergency brake, removes the guide from above the trailer cup 20, shown in FIG. 2, and lowers the trailer onto the trailer hitch on the rear bumper of the vehicle. The driver can then turn off the battery switch 16, shown in FIG. 1, and store the guide.

The best dimensional relationships for the parts of the invention described above, including variations in form and use, will be readily apparent to those skilled in the art, and are intended to be encompassed by the present invention.

What is claimed is:

1. A guide for attaching a vehicle to a trailer comprising
a direction light,
a probe-operated light,
a supporting pole,
means of adjusting a height of the direction light and the probe-operated light,
means of adjusting a directional orientation of the direction light and the probe-operated light,
means of supplying electrical power to the direction light and the probe-operated light,
a directional probe comprising
    a spring-loaded telescoping probe having at least two sections that telescope relative to one another, such that compressing the telescoping probe to a preconfigured position turns on the probe-operated light, and
    wires attaching the directional probe to at least one battery,
means of attaching the directional probe to the guide, and
means of attaching the guide to a trailer.

2. A guide for attaching a vehicle to a trailer comprising
a direction light;
a directional probe;

a probe-operated light, wherein the probe-operated light is turned on when the directional probe is compressed to a position such that a trailer cup on a trailer to which the guide is mounted is in position for attachment to a trailer hitch on a vehicle, wherein said directional probe is spring-loaded and has at least two sections that telescope relative to one another;

a supporting pole;

means of adjusting a height of the direction light and the probe-operated light;

means of adjusting a directional orientation of the direction light and the probe-operated light;

the guide further comprising at least one swiveling clamp for attaching the directional probe to the guide;

at least one battery; and at least one clamp for attaching the guide to a trailer.

3. The means of adjusting the height of the direction light and the probe-operated light of claim 2, wherein the means of adjusting the height of the direction light and the probe-operated light comprises a telescoping shaft that slides within the supporting pole, and a tension collar.

4. The means of adjusting the directional orientation of the direction light and the probe-operated light of claim 2, wherein the means of adjusting the directional orientation of the direction light and the probe-operated light comprises a telescoping shaft that rotates within the supporting pole, and a tension collar.

5. The means of adjusting the directional orientation of the direction light and the probe-operated light of claim 2, wherein the means of adjusting the directional orientation of the direction light and the probe-operated light comprises a ball and socket joint on a housing for the lights.

\* \* \* \* \*